United States Patent
Sprock et al.

(10) Patent No.: US 6,974,934 B2
(45) Date of Patent: Dec. 13, 2005

(54) REMOTE REFERENCE RESISTOR

(75) Inventors: Douglas A. Sprock, San Jose, CA (US); Robert A. Carney, Belmont, CA (US); David K. Thiesen, Bakersfield, CA (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 10/334,344

(22) Filed: Dec. 30, 2002

(65) Prior Publication Data

US 2004/0125856 A1 Jul. 1, 2004

(51) Int. Cl.[7] ................................................ H05B 1/02
(52) U.S. Cl. ...................... 219/497; 219/499; 219/483; 359/132; 307/117
(58) Field of Search ................................ 219/497, 499, 219/501, 505, 483, 486, 490, 494; 307/117; 359/132, 187; 372/20, 32

(56) References Cited

U.S. PATENT DOCUMENTS

| | | | | |
|---|---|---|---|---|
| 4,771,393 A | * | 9/1988 | Ishida et al. ................ | 702/133 |
| 5,036,702 A | * | 8/1991 | Akamatsu et al. ........ | 73/204.15 |
| 5,183,039 A | * | 2/1993 | Sarian et al. ................. | 607/96 |
| 5,325,229 A | * | 6/1994 | Millard ........................ | 359/330 |
| 5,360,266 A | * | 11/1994 | Lenfers et al. ................ | 374/36 |
| 5,936,987 A | | 8/1999 | Ohishi et al. | |
| 6,231,153 B1 | * | 5/2001 | Elgee ........................... | 347/17 |
| 6,483,625 B2 | * | 11/2002 | Shimura et al. .............. | 398/95 |

* cited by examiner

*Primary Examiner*—Mark Paschall
(74) *Attorney, Agent, or Firm*—Blakely, Sokoloff, Taylor & Zafman LLP

(57) ABSTRACT

An apparatus including a reference resistor for use with ratiometric temperature sensing of a device to be sensed. The resistive element has a resistance dependant upon a temperature of the device to be sensed and is electrically coupled to a reference resistor. The reference resistor is maintained at a substantially constant temperature by a temperature controller. A sensor circuit is electrically coupled to the resistive element and the reference resistor to sense their electrical parameters when a current passes through them.

29 Claims, 4 Drawing Sheets

REMOTE REFERENCE RESISTOR

CROSS REFERENCE TO RELATED APPLICATIONS

The present application is related to co-pending U.S. application Ser. No. 10/334,509 entitled, "Method and Apparatus To Sense Temperature of Thermal Tuning Elements in Tunable Optical Device" filed on the same date as the present application.

TECHNICAL FIELD

This disclosure relates generally to reference resistors, and in particular but not exclusively, relates to reference resistors used in connection with monitoring and/or controlling the temperature of a device to be sensed.

BACKGROUND INFORMATION

Tunable external cavity lasers ("ECLs") are widely used in lightwave test-and-measurement equipment and are becoming recognized as essential components for the rapidly expanding field of wavelength division multiplexed ("WDM") optical communication. The many applications within this field require many different sets of performance specifications. However, the following are some typical requirements: small form factor of the optomechanical assembly and control system, control over the output laser wavelength, reliability of the laser assembly, and inexpensive fabrication costs.

A known method to selectively tune the central lasing wavelength of an ECL is to place a wedge shaped optical filter in the path of the laser beam. Tuning is obtained by moving the wedge filter across the optical path. Tuning results from the variation in the thickness of the wedged shape filter that intersects with the laser beam. Alternatively, rotating a flat optical filter in the laser beam path will achieve the desired tuning effect by adjusting the path length that the laser beam must traverse through the optical filter.

These methods of tuning an ECL are undesirable, as they require placement of a mechanical actuator, such as a motor, within the ECL module to effect the desired translation or rotation of the optical filter. Placement of a motor within the ECL module can disrupt other sensitive optic elements that include an ECL and generate disruptive electromagnetic interference. Furthermore, the motor is a severe limitation on the need to miniaturize modern ECL modules. Small motors can be relatively expensive and the use of any mechanical device with moving parts tends to be less reliable than stationary mechanical and electronic substitutes.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of an apparatus and method of a remote reference resistor for use with ratiometric sensing are described herein. In the following description, numerous specific details are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In embodiments of the present invention, an external cavity laser ("ECL") is tuned via thermal expansion/contraction of an optical filter residing in the optical beam path. Thermal expansion may be achieved using a thermal actuator to selectively control the temperature of the optical filter. However, to implement this solution the temperature of the optical filter must be accurately sensed and monitored. It should be noted, that embodiments of the present invention, described below, are not limited to sensing and/or monitoring optical filters only. Rather, embodiments may be applied to sensing and/or monitoring the temperature of almost any electrical or mechanical device or apparatus.

Figure 1:
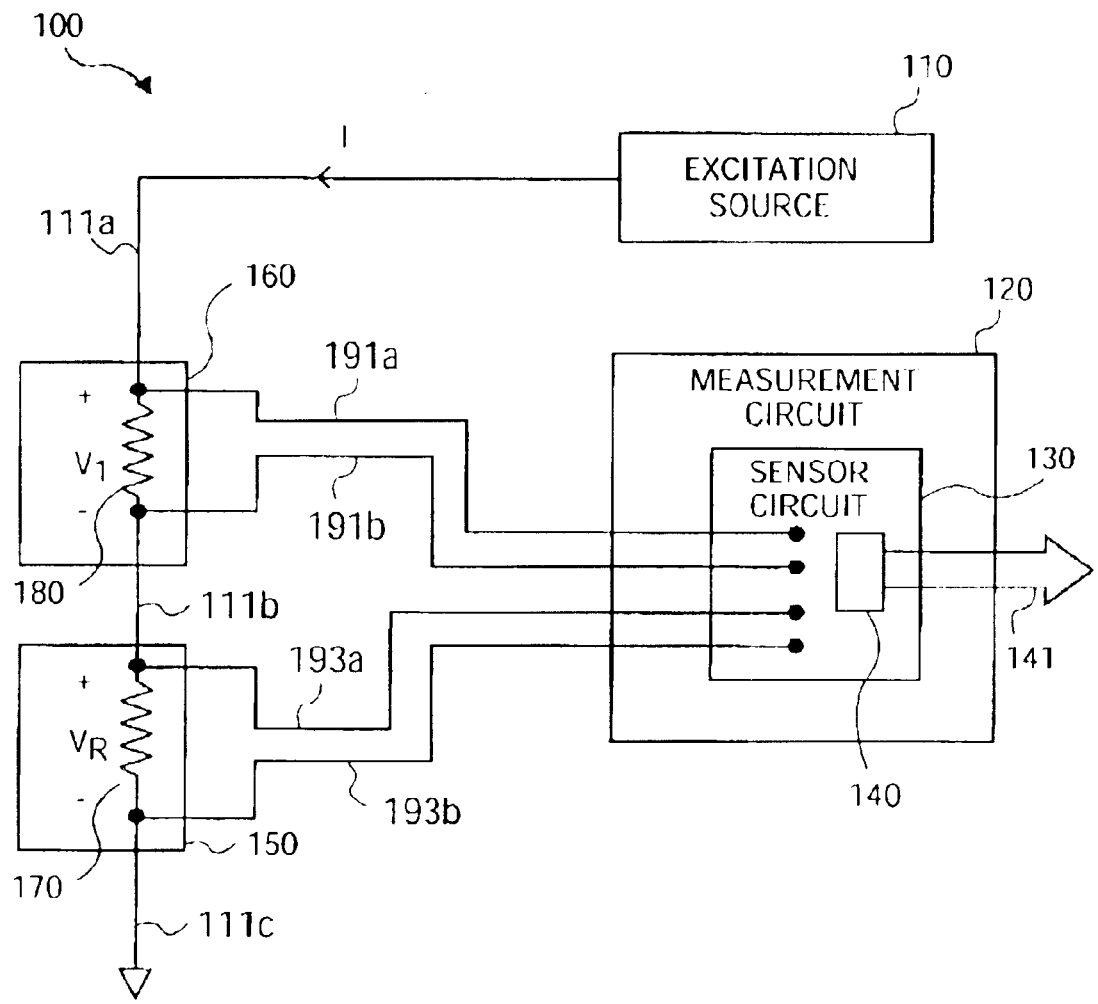
FIG. 1 illustrates an embodiment of a ratiometric temperature sensor circuit using a remote reference resistor in accordance with the teachings of the present invention.

FIG. 1 illustrates a ratiometric temperature sensor circuit ("RTSC") 100, according to an embodiment of the present invention. In this embodiment, RTSC 100 includes excitation source 110, device to be sensed 160, resistive element 180, temperature controller 150, reference resister 170 and measurement circuit 120. This embodiment of measurement circuit 120 includes sensor circuit 130 having logic element 140.

The elements of RTSC 100 are interconnected as follows. Resistive element 180 is connected to excitation source 110 via line 11$a$. The term "line" as used in this context refers to any electrical conductor. Resistive element 180 is connected in series with reference resistor 170 via line 111$b$ at a first end and grounded at the opposite end via line 111$c$. Sensor circuit 130 is connected to resistive element 180 on either end via sense lines 191$a$ and 191$b$. Similarly, sensor circuit 130 is connected to either end of reference resistor 170 via reference lines 193$a$ and 193$b$.

In this embodiment, resistive element 180 is thermally coupled to device to be sensed 160. This thermal coupling may be achieved using a thermal adhesive, a chemical deposition process that thermally bonds the two elements together or by any suitable manner that provides good thermal conduction between the two. In a similar manner, reference resister 170 is thermally coupled to temperature controller 150. In an alternative embodiment, resistive element 180 is a symbolic notation representing the inherent resistance of device to be sensed 160. In this alternative embodiment, lines 111a and 111b would be attached directly to device to be sensed 160.

Device to be sensed 160 maybe any device in which it is desirable to sense and/or monitor its temperature. Thus, device to be sensed 160 could be a mechanical, optical, or electrical device standing alone or part of a larger circuit or apparatus.

In accordance with the present invention, resistive element 180 may be any resistive material that has a nonzero temperature coefficient of resistivity ("TCR"). In one embodiment, resistive element 180 may have a near constant TCR in the range surrounding the operating temperature of the device to be sensed 160. A constant TCR in the operating temperature range provides a linear relationship between resistance and temperature. A linear relationship between resistance and temperature enables one to measure the resistance of resistive element 180 at two different temperatures and then extrapolate all other resistances within the operating temperature range. For example, in one embodiment, resistive element 180 includes a metal such as Platinum or other suitable material.

In embodiments of the present invention, temperature controller 150 maintains reference resistor 170 at a relatively constant temperature. Thus, in some cases temperature controller 150 is capable of sinking heat, in others it is capable of pumping heat, and yet in others it is capable of both functions. Heat pumps and/or sinks are well known, but some typical examples include a regulated heating plate, a fan, a Peltier device, or the like. In one embodiment, temperature controller 150 includes a heater responsive to a thermistor attached thereto.

Reference resistor 170 may be any resistive element having a known resistance at the operating temperature of temperature controller 150. For example, in one embodiment, reference resistor 170 is a surface mount resistor. It is not necessary that reference resistor 170 have low resistance error tolerances, rather, its actual resistance need only be measured and known to the degree of specificity required by the application.

In the embodiment shown in FIG. 1, measurement circuit 120 includes sensor circuit 130; however, in an alternative embodiment it also includes excitation source 110. Similarly, in the embodiment shown sensor circuit 130 includes logic element 140; however, in an alternative embodiment logic element 140 is externally coupled to sensor circuit 130. Depending upon the apparatus and configuration thereof, these components may be internal or external to measurement circuit 120. Excitation source 110 includes a current source or a voltage source to generate current I, which flows through resistive element 180 and reference resistor 170. In one embodiment, sensor circuit 130 is an analog-to-digital converter ("ADC") capable of receiving one or more analog voltages and converting them into representative digital values. In this embodiment, logic element 140 generates a ratiometric output, ratio 141, of the representative digital values. Thus in this embodiment, logic element 140 includes an arithmetic logic unit ("ALU"). In other embodiments, sensor circuit 130 and logic element 140 may include analog circuitry capable of receiving input voltages and generating an output that is the ratio of the input voltages. In still other embodiments, logic element 140 may be firmware or software operating within measurement circuit 120 or executed by an attached central processing unit ("CPU") or an application specific integrated circuit ("ASIC").

Figure 2:
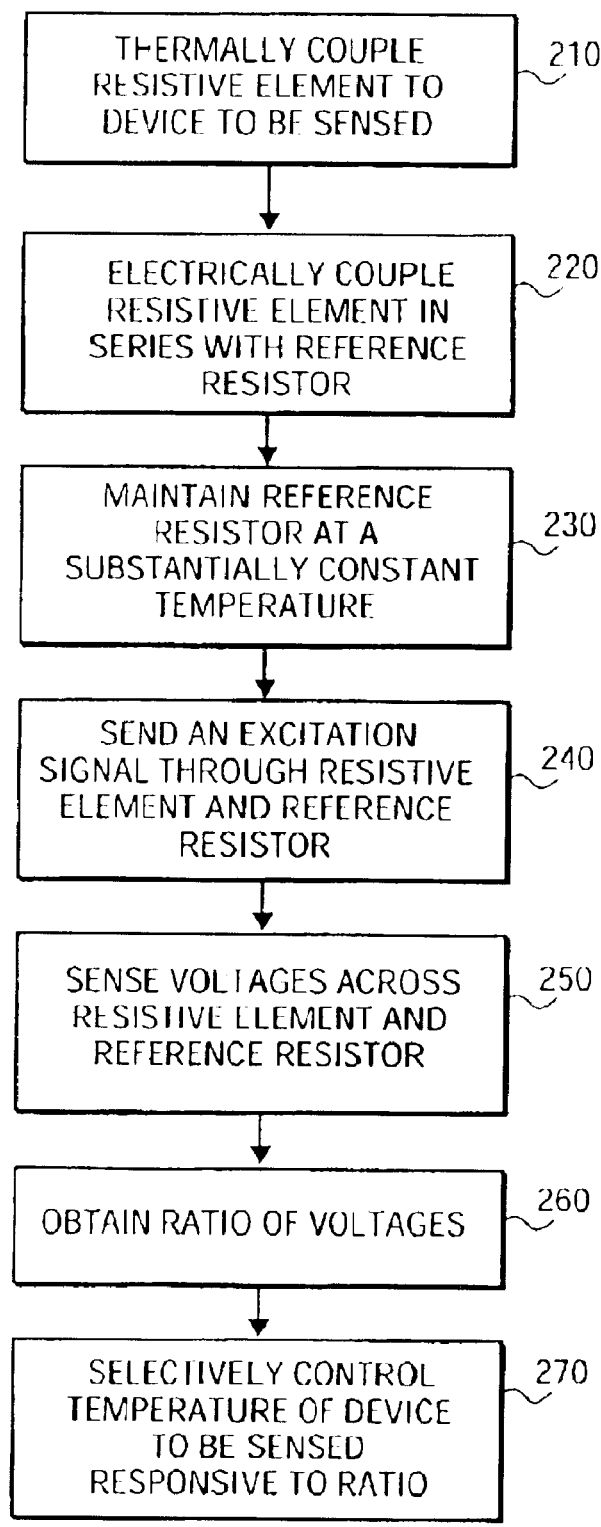
FIG. 2 illustrates a method to implement an embodiment of a ratiometric temperature sensor circuit using a remote reference resistor in accordance with the teachings of the present invention.

Turning now to FIGS. 1 and 2, one embodiment of RTSC 100 operates as follows to monitor the temperature of device to be sensed 160. As mentioned above, resistive element 180 is thermally coupled to device to be sensed 160 (process block 210) and also electrically coupled in series with reference resistor 170 (process block 220).

In process block 230, reference resistor 170 is maintained at a substantially constant temperature. Since resistance of most elements and alloys vary with temperature, maintaining reference resistor at a substantially constant temperature ensures that it maintains a near constant resistance.

In process block 240, an excitation signal, represented in FIG. 1 as current I, is driven through resistive element 180 and reference resistor 170 by excitation source 110. Since resistive element 180 and reference resistor 170 are connected in series, current I is equivalent through both elements. As current I passes through resistive element 180, a potential difference $V_1$ is established across resistive element 180. Similarly, a potential difference $V_R$ is established across reference resistor 170. As the temperature of device to be sensed 160 (which is thermally coupled with resistive element 180) varies, potential difference $V_1$ will vary in an amount proportional to the change in temperature and resistive element 180's TCR.

In process block 250, potential differences $V_1$ and $V_R$ are sensed by sensor circuit 130 via sense lines 191 and 193, respectively. In process block 260, logic element 140 compares potential difference $V_1$ and potential difference $V_R$ by dividing their values to generate ratio 141. According to Ohm's Law, $$V = IR(T) \tag{1}$$

where V represents voltage, I represents current, and R(T) indicates resistance as a function of temperature T. Similarly, $$V_1 = IR_1(T_1) \tag{2}$$

$$V_R = IR_R(T_R) \tag{3}$$

where $R_1$ is the resistance of resistive element 180, $T_1$ is the temperature of resistive element 180, $R_R$ is the resistance of reference resistor 170, and $T_R$ is the temperature of reference resistor 170. Since temperature controller 150 maintains $T_R$ substantially constant, $R_R$ is also substantially constant. Thus, ratio 141 is proportional to $T_x$. In this way, measurement circuit 120 is capable of monitoring the temperature of device to be sensed 160.

In some applications of RTSC 100, it may be desirable to control the temperature of device to be sensed 160. In process block 270, the temperature of device to be sensed 160 is selectively controlled using a thermal actuator responsive to ratio 141.

Figure 3:
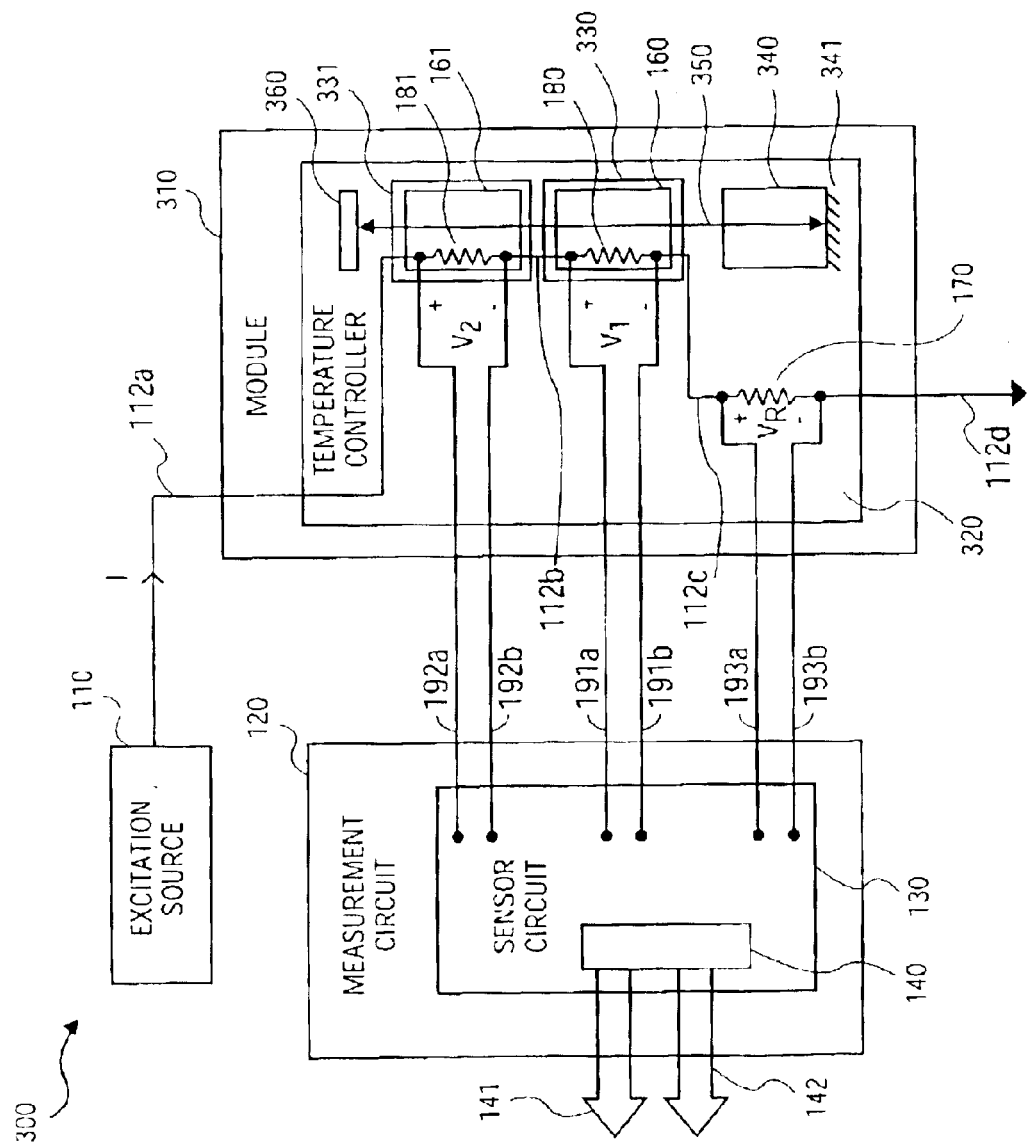
FIG. 3 illustrates an embodiment of a ratiometric thermal laser tuner using a remote reference resistor in accordance with the teachings of the present invention.

FIG. 3 illustrates a ratiometric thermal laser tuner ("RTLT") 300, according to an embodiment of the present invention. In this embodiment, RTLT 300 includes excitation source 110, module 310, and measurement circuit 120. In this embodiment module 310 includes devices to be sensed 160 and 161, thermal actuators 330 and 331, resistive elements 180 and 181, temperature controller 320, reference resister 170, gain medium 340, and, reflective element 360. In this embodiment measurement circuit 120 includes sensor circuit 130 having logic element 140 to generate ratios 141 and 142.

In one embodiment, the elements of RTLT 300 are interconnected as follows. Resistive elements 180 and 181 are connected in series with reference resistor 170 via lines 112b and 112c. Reference resistor 170 can be implemented using any suitable resistor; however, it is desirable to use a resistor having a low TCR. For example, in one embodiment, reference resistor 170 is implemented using a model VSM0805 surface mount resistor available from Vishay Intertechnology, Inc., Santa Clara, Calif. Resistive element 181 is connected to excitation source 110 via line 112a. Excitation source 110 can be implemented using any suitable current or voltage source. For example, in one embodiment, excitation source 110 is implemented using a model LM4120 voltage reference available from National Semiconductor Corp., Santa Clara, Calif. Reference resistor 170 is grounded via line 112d. Sensor circuit 130 is connected to either ends of resistive elements 180 and 181 via sense lines 191a and 191b and sense lines 192a and 192b, respectively. Although sense lines 191a and 192b are depicted as individual lines, they could be a single line since they are both connected to line 112b. Similarly, sensor circuit 130 is connected to either end of reference resistor 170 via reference lines 193a and 193b. Again, sense line 191b and reference line 193a may be implemented with a single line since both are connected to line 112c. In one embodiment, sensor circuit 130 is implemented using model ADS 1217 available from Texas Instrument Inc., Dallas, Tex.

In this embodiment, resistive elements 180 and 181 are thermally coupled to devices to be sensed 160 and 161, respectively, as discussed above in connection with RTSC 100. In a similar manner, reference resister 170 is thermally bonded to temperature controller 320, such as for example, reference resistor 170 can be soldiered to temperature controller 320 thereby effectuating a thermal bond. In an alternative embodiment, resistive elements 180 and 181 are symbolic notations representing the inherent resistance of devices to be sensed 160 and 161. In this alternative embodiment, lines 112a, 112b, and 112c would be attached directly to devices to be sensed 160 and 161, accordingly.

In one embodiment, devices to be sensed 160 and 161 are thermally mounted onto thermal actuators 330 and 331, respectively, which are in turn mounted on temperature controller 320. In an alternative embodiment, thermal actuators 330 and 331 are resistive elements etched onto the surface of devices to be sensed 160 and 161 during a thin film deposition process. In this alternative embodiment, thermal actuators are made of the same material as resistive elements 180 and 181, but having different widths and thickness. In this embodiment, current is driven through thermal actuators 330 and 331 causing them to generate heat to selectively control the temperature of devices to be sensed 160 and 161.

In one embodiment, gain medium 340 having a rear partially reflective facet 341 and reflective element 360 are mounted on temperature controller 320, orientated along the optical path of laser beam 350, with devices to be sensed 160 and 161 residing in between. In this embodiment, gain medium 340, devices to be sensed 160 and 161 and reflective element 360 form an external cavity laser ("ECL"). Reflective element 360 and partially reflective facet 341 define the extremities of the external cavity. Module 310 may include other elements of an ECL, such as collimating and focusing lens, polarizing optics configured to remove spurious feedback, etc., but are excluded from FIG. 3 for clarity. The relative size, shape and distances between the various components of this embodiment of module 310 are in some instances exaggerated for clarity and are not necessarily shown to scale.

In one embodiment, gain medium 340 includes a conventional Fabry-Perot diode emitter chip having an anti-reflective coating on one end and partially reflective facet 341 on the other. In this embodiment, devices to be sensed 160 and 161 are optical filters, such as for example, etalons. When gain medium 340 generates laser beam 350 it passes through devices to be sensed 160 and 161 to be reflected off reflective element 360. Reflected laser beam 350 is fed back along the optical axis, through devices to be sensed 161 and 160 into gain medium 340. Conventional output coupler optics (not shown) may be associated with partially reflective facet 341.

In order to tune the central lasing wavelength of this ECL, the temperature of devices to be sensed 160 and 161 may be selectively adjusted, thus changing their optical characteristics. The temperatures of devices to be sensed 160 and 161 are selectively controlled by thermal actuators 330 and 331, respectively. In one embodiment, thermal actuators 330 and 331 include a thermal conducting pad, such as for example, a ceramic plate and a peltier device attached thereto. Any appropriate heat sink/pump device may be used to implement thermal actuators 330 and 331.

Similarly, in one embodiment of module 310, temperature controller 320 includes a thermal base made of a conducting material, such as for example ceramic, with a heat sink and/or heat pump attached thereto. In one embodiment, temperature controller 320 is capable of selecting and maintaining a substantially constant temperature, allowing a temperature drift of not more than 0.2 degrees Celsius from the selected operating temperature. By maintaining temperature controller 320 at a substantially constant operating temperature, reference resistor 170 is also maintained at a substantially constant operating temperature and thus fluctuations in its temperature dependant resistance are limited.

When excitation source 110 drives current 1 across resistive elements 180 and 181 and reference resistor 170, potential differences $V_1$, $V_2$, and $V_R$ are established across the respective components. As described above in connection with RTSC 100, sensor circuit 130 senses these potential differences and logic element 140 is capable to generate output ratios 141 and 142. In one embodiment, output ratio 141 represents the ratio $V_1/V_R$. In an alternative embodiment, output ratio 141 represents the ration $V_R/V_1$. Similarly, in one embodiment, output ratio 142 represents the ratio $V_2/V_R$. In an alternative embodiment, output ratio 142 represents the ratio $V_R/V_2$. Ratios 141 and 142 may then be used to selectively control the temperatures of thermal actuator 330 and 331, respectively.

In one embodiment, temperature control is implemented using a look up table of ratio values versus temperature. The table may be obtained by characterizing the temperature dependence of resistive elements 180 and 181. If resistive elements 180 and 181 comprise a material having a substantially linear TCR in the operating temperature range, logic element 140 need only know two resistance/temperature calibration points for each resistive element 180 and 181 and the resistance of reference resistor 170 at its operating temperature. All resistance/temperature points for resistive elements 180 and 181 intermediate to the calibration points may be extrapolated.

Placement of resistive element 170 within module 310, as opposed to within measurement circuit 120 is advantageous for a number of reasons. First, if module 310 and measurement circuit 120 are mass-produced, any particular module 310 or particular measurement circuit 120 is easily interchangeable with another like device. Only a single set of resistance/temperature calibration data for any particular module 310 need be measured. Then this calibration data for the particular module 310 may be provided to any particular measurement circuit 120 with which it is coupled. Thus, resistance/temperature calibration may be conducted in the factory where module 310 is produced. If measurement circuit 120 of RTLT 300 is replaced with a new measurement circuit 120, it is not necessary to obtain new calibration data for module 310.

A second advantage, relates to temperature controller 320. Temperature controller 320 is present in module 310, in part, for the purpose of selectively controlling the distance between reflective element 360 and partially reflective facet 341 via thermal expansion and contraction. Thus, no additional components are necessary for controlling the temperature of reference resistor 170 when it is mounted on temperature controller 320. If reference resistor 170 were located within measurement circuit 120 and accurate control over the temperature of devices to be sensed 160 and 161 were required, its temperature would need to be regulated with independent temperature control circuitry.

A third advantage to placing reference resistor 170 within module 310 relates to economy of manufacturing. Because temperature controller 320 limits temperature excursions, reference resistor 170 need not be a resistor with tight resistance deviation tolerances. Rather, a less expensive resistor with looser deviation tolerances may be used. In this case, the temperature dependant resistance of reference resistor 170 may be measured, at the time of calibration, to the required specificity for the particular application of module 310. Thus, embodiments of the present invention provide a cost effective and more accurate means of sensing the temperature of devices to be sensed 160 and 161.

Figure 4:
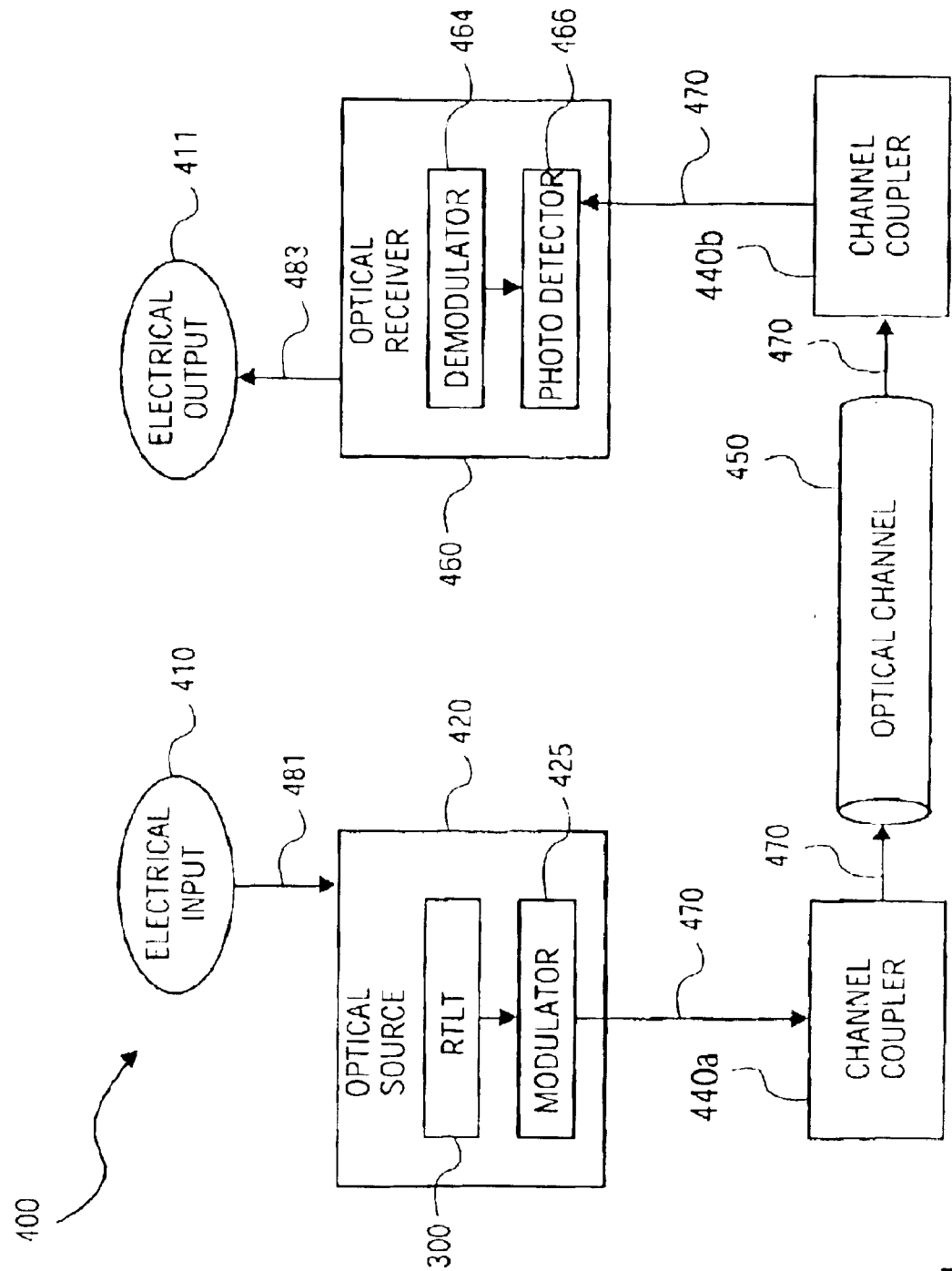
FIG. 4 illustrates an embodiment of an optical communication system including a ratiometric thermal laser tuner using a remote reference resistor in accordance with the teachings of the present invention.

FIG. 4 illustrates an optical communication system 400, implemented using an embodiment of the present invention. In this embodiment, optical communication system 400 includes optical source 420, optical receiver 460, optical channel 450 and channel couplers 440a and 440b. In this embodiment optical source 420 includes RTLT 300 and modulator 425. In this embodiment, optical receiver includes photodetector 466 and demodulator 464.

Optical source 420 receives electrical input 410 from attached devices for communicating with devices attached to optical receiver 460. In this embodiment, RTLT 300 is coupled to modulator 425. In one embodiment, modulator 425 receives laser beam 350 through partially reflective facet 341 and modulates laser beam 350 to generate modulated light beam 470. In this case, modulator 425 can be an electro-optic, acousto-optic, electro-absorptive, or other modulator. In an alternative embodiment, modulator 425 is electrically coupled to RTLT 300 to modulate a junction current through gain medium 340. Modulator 425 can be any means known to those of ordinary skill in the art to modulate a light source. In either embodiment, modulator 425 modulates light beam 470 in response to electrical input 410.

Light beam 470 is coupled to optical channel 450 via channel coupler 440a. Embodiments of optical channel 450 include optical wave guides, such as an optic fiber, or free space with a line of sight and/or mirrors for transmission of light beam 470 to channel coupler 440b. Channel coupler 440b optically couples optical channel 450 to photodetector 466. Photodetector 466 receives modulated light beam 466 and converts it to a modulated electric signal. The modulated electric signal is demodulated by demodulator 464 and outputted from optical receiver 460 as electrical output 411. Electrical output 411 may then be received by attached devices for unidirectional or bi-directional communication with attached devices to optical source 420.

In this embodiment of optical communication system 400, embodiments of RTLT 300 are used to selectively control the central lasing wavelength of the ECL described in connection with FIG. 3. By controlling this central lasing wavelength, optical source 420 can transmit light beam 470 at selectable wavelengths. In this manner, wavelength division multiplexing across optical channel 450 is possible.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a first resistive element to have a first resistance dependant upon a first temperature of a first device to be sensed;
   a reference resistor electrically coupled to the first resistive element;
   a temperature controller thermally coupled to the reference resistor to maintain the reference resistor at a substantially constant temperature independent of the first temperature of the first device to be sensed; and
   a sensor circuit electrically coupled to the first resistive element and the reference resistor, the sensor circuit to sense a first electrical parameter of the first resistive element and a second electrical parameter of the reference resistor when a current passes through the first resistive element and the reference resistor.

2. The apparatus of claim 1 wherein the first resistive element comprises the first device to be sensed.

3. The apparatus of claim 1 wherein the reference resistor is electrically coupled in series with the first resistive element, the first electrical parameter is a first voltage across the first resistive element, and the second electrical parameter is a second voltage across the reference resistor.

4. The apparatus of claim 1 wherein the reference resistor and the first device to be sensed are mounted to a module physically separate from the sensor circuit.

5. The apparatus of claim 4 wherein the first device to be sensed comprises an optical filter.

6. The apparatus of claim 5 wherein the optical filter comprises an etalon.

7. The apparatus of claim 5 wherein the module comprises a wavelength tunable laser.

8. The apparatus of claim 1, further comprising a second resistive element to have a second resistance dependant upon a second temperature of a second device to be sensed, the second resistive element electrically coupled to the first resistive element, the sensor circuit electrically coupled to the second resistive element to sense a third electrical parameter of the second resistive element when the current passes through the second resistive element.

9. The apparatus of claim 1 wherein the sensor circuit further comprises a logic element to obtain a ratio of the first electrical parameter to the second electrical parameter.

10. The apparatus of claim 9, further comprising a thermal actuator to adjust the first temperature of the first device to be sensed responsive to the ratio.

11. The apparatus of claim 1 wherein the temperature controller comprises a thermal base.

12. The apparatus of claim 1 wherein the first resistive element comprises a material having a substantially linear temperature coefficient of resistivity over a selected operating temperature of the first device to be sensed.

13. A method, comprising:
sending an excitation signal through a resistive element and a reference resistor, the resistive element having a resistance dependant upon a first temperature of a device to be sensed;
maintaining the reference resistor at a substantially constant temperature independent of the first temperature of the first device to be sensed; and
sensing a first electrical parameter of the resistive element and a second electrical parameter of the reference resistor.

14. The method of claim 13 wherein the resistive element comprises the device to be sensed.

15. The method of claim 13 wherein the first electrical parameter comprises a first voltage across the resistive element and the second electrical parameter comprises a second voltage across the reference resistor.

16. The method of claim 13, further comprising obtaining a ratio of the first voltage to the second voltage.

17. The method of claim 16, further comprising selectively controlling the temperature of the device to be sensed responsive to the ratio.

18. The method of claim 17 wherein the device to be sensed comprises an optical filter.

19. The method of claim 13 wherein maintaining the reference resistor at the substantially constant temperature allows a temperature drift of less than 0.2 degrees Celsius from a selected operating temperature.

20. The method of claim 13 wherein electrically coupling the resistive element to the reference resistor further comprises physically locating the device to be sensed, the resistive element, and the reference resistor within a module.

21. The method of claim 20 wherein a sensor circuit physically separate from the module is used in sensing the first electrical parameter and the second electrical parameter.

22. The method of claim 21 wherein the module comprises a wavelength tunable laser.

23. An optical communication system, comprising:
an optical source to generate an optical signal, the optical source having a resistive element thermally coupled to a device to be sensed, the resistive element to have a first resistance dependant upon a first temperature of the device to be sensed, a reference resistor electrically coupled to the resistive element, a temperature controller thermally coupled to the reference resistor to maintain the reference resistor at a substantially constant temperature independent of the first temperature of the first device to be sensed, and a sensor circuit electrically coupled to the resistive element and the reference resistor, the sensor circuit to sense a first electrical parameter of the resistive element and a second electrical parameter of the reference resistor; and
an optical channel optically coupled to the optical source to transmit the optical signal.

24. The optical communication system of claim 23 wherein the device to be sensed comprises an optical filter.

25. The optical communication system of claim 24 wherein the reference resistor and the optical filter are mounted to a module physically separate from the sensor circuit.

26. The optical communication system of claim 25 wherein the module comprises a wavelength tunable laser.

27. The optical communication system of claim 24 wherein the sensor circuit, further comprises a logic element to obtain a ratio of the first electrical parameter to the second electrical parameter.

28. The optical communication system of claim 27, further comprising a thermal actuator to adjust a temperature of the optical filter responsive to the ratio.

29. An apparatus, comprising:
a first device to be sensed;
a first resistive element thermally coupled to the first device to be sensed and to have a first resistance dependant upon a first temperature of the first device to be sensed;
a reference resistor electrically coupled to the first resistive element;
a temperature controller thermally coupled to the reference resistor to maintain the reference resistor at a substantially constant temperature independent of the first temperature of the device to be sensed;
a sensor circuit coupled to sense a first electrical parameter of the resistive element and a second electrical parameter of the reference resistor and to generate a ratio of the first electrical parameter to the second electrical parameter; and
a thermal actuator thermally coupled to the first device to be sensed to adjust the first temperature in response to the ratio.

* * * * *